Oct. 6, 1953 R. E. O. OLSSON ET AL 2,654,808

MAGNETIC SOUND RECORDING AND REPRODUCING APPARATUS

Filed May 15, 1951

INVENTOR:
ROBERT E. O. OLSSON AND
ALLAN B. DAHL
By: Young, Emery & Thompson
Attys.

Patented Oct. 6, 1953

2,654,808

UNITED STATES PATENT OFFICE 2,654,808

MAGNETIC SOUND RECORDING AND REPRODUCING APPARATUS

Robert Erik Olov Olsson and Allan Birger Dahl, Motala, Sweden, assignors to Industriaktiebolaget Luxor, Motala, Sweden, a corporation of Sweden Application May 15, 1951, Serial No. 226,386
In Sweden May 25, 1950

2 Claims. (Cl. 179—100.2)

The present invention relates to magnetic sound recording and reproducing apparatus of the type comprising a supply reel and a take-up reel between which a magnetic sound carrier is movable, said sound carrier passing through a guide groove provided in a magnetic head and being wound onto the take-up reel during the recording and playback periods and onto the supply reel during the rewind periods.

The object of the invention is to reduce the wear on the magnetic head caused by the sound carrier during the rewind periods when the speed of said carrier and hence the contact pressure between the same and the magnetic head is greater than during the recording and playback periods.

To this end a sound carrier lifting member is movably mounted on the magnetic head, said member being frictionally engaged by the sound carrier so as to be moved by the same on reversal of its direction of movement between a recording and playback position in which the sound carrier contacts the magnetic head with a pressure suitable for recording and playback purposes, and a rewind position in which said member lifts the sound carrier and reduces the contact pressure between the same and the magnetic head.

For the explanation of the invention reference is had to the accompanying drawing wherein—

Figure 1:
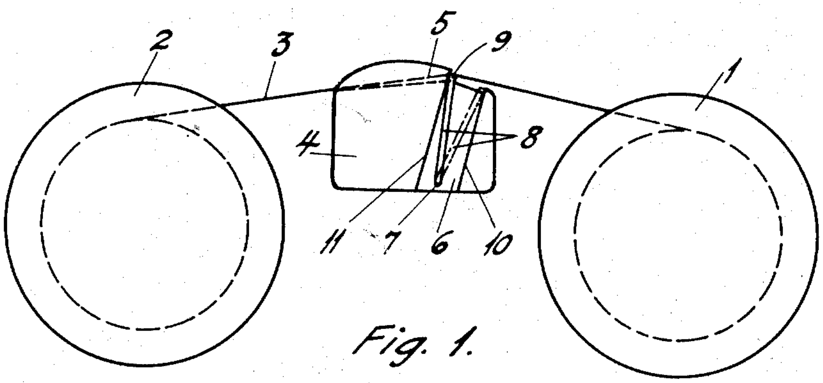
Fig. 1 is a plan view of a first embodiment of the invention.

In Fig. 1 reference numerals 1 and 2 designate two reels which are rotatably mounted in the base plate (not shown) of the magnetic recorder and between which a magnetic sound carrier in the shape of a thin steel wire 3 runs. The said reels, of which reel 1 is the take-up reel and reel 2 the supply reel, may be connected one at a time to an electric motor for rotating the same. During the recording and playback periods the take-up reel 1 is rotated clockwise so that the wire 3 moves to the right and is wound onto the take-up reel, and during the rewind periods the supply reel 2 is rotated anti-clockwise so that the wire 3 moves to the left and is wound onto the supply reel. Between the two reels 1 and 2 the wire 3 is adapted to run through a guide groove 5 provided in the magnetic head 4 of the apparatus. During the rewind periods the speed of the wire 3 is much greater than during the recording and playback periods, being for instance 5–15 times the forward speed, and therefore also the pressure of the wire on the wall of the guide groove 5 in the magnetic head is greater and may cause excessive wear of the head.

According to Fig. 1 a shallow channel 6 having the side walls 10 and 11 is provided in the upper end surface of the magnetic head 4. A hole is drilled in the head perpendicularly to the bottom of the channel 6, and in this hole one leg 7 of a U-bent rod 8 is rotatably mounted. The other leg 9 of the rod extends under the wire 3 transversely to the same adjacent the guide groove 5 through a lateral recess made in the magnetic head and forming a continuation of the shallow channel 6 in the upper surface of the head.

The operation of this device is as follows:

At the beginning of a recording or playback period when the wire 3 moves to the right the U-bent rod 8 due to its frictional engagement with the wire 3 is turned clockwise by the wire into the position shown in dotted lines in Fig. 1 in which position the rod abuts against the right hand side wall 10 of the channel 6. The wire 3 then contacts the bottom of the guide groove 5 with a pressure which is suitable for recording and reproducing purposes.

In the subsequent rewind period in which the wire 3 moves to the left the rod 8 due to its frictional engagement with the wire 3 is turned anti-clockwise into the position shown in full lines and in which the rod abuts against the left hand side wall 11 of the channel 6. This turning movement results therein that the wire 3 is raised somewhat at the point of engagement with the rod so that the contact pressure and hence the wear on the wall of the guide groove 5 is reduced.

Figure 2:
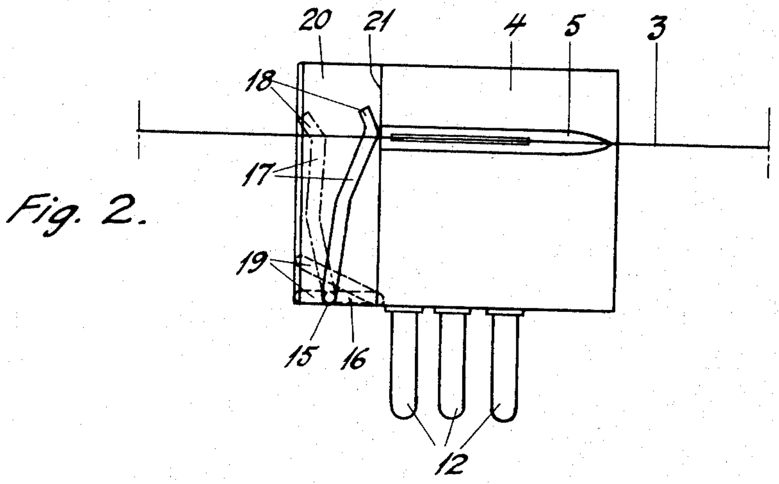
Figs. 2 and 3 are a side view and a plan view, respectively, of a second embodiment.
Figure 3:
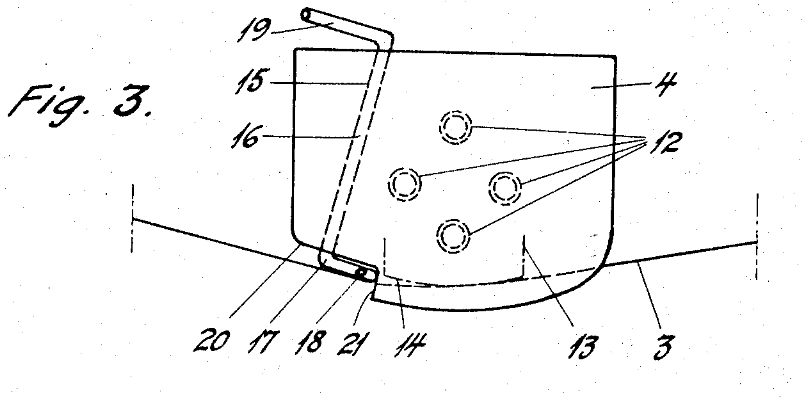

In Figs. 2 and 3 the reference numerals 3, 4 and 5 also designate the steel wire, the magnetic head and the guide groove, respectively. In these figures, however, the wire 3 is assumed to move in the opposite direction as compared with Fig. 1.

In the bottom of the magnetic head 4 four contact pins 12 are arranged which serve to connect the windings contained in the head with the amplifier and the high frequency oscillator of the apparatus. The windings are mounted on an iron core 13 (Fig. 3) having a side surface 14 along which the steel wire 3 runs.

In the bottom surface of the magnetic head 4 a transverse groove 15 is provided in which one leg 16 of an angularly bent rod is rotatably mounted. The leg 16 extends in a plane which is substantially perpendicular to the plane through the shafts of the reels and, as shown, the same forms an acute angle with the longitudinal direction of the wire 3. The other leg 17 of the said rod extends upwardly at the front surface of the head through a recess 20 made therein and having a marginal wall 21, and the upper free end 18 of the leg 17 extends transversely to the guide groove 5 under the wire 3. The end of the first-mentioned leg 16 is angularly bent, as shown at 19, and limits the turning movement of the rod 16, 17 in the anti-clockwise direction by abutment against the housing (not shown) of the magnetic head.

The operation of this device is analogous to that described in connection with Fig. 1.

During the recording and playback periods when the wire 3 moves to the left the rod 16, 17 due to its frictional engagement with the wire 3 is turned by the latter into the position shown in dotted lines in Fig. 2 and in this position the wire 3 contacts the bottom of the guide groove 5 with a pressure suitable for recording and reproducing purposes.

During the rewind periods when the wire 3 moves to the right the rod 16, 17 is turned by the wire 3 into the position shown in full lines in Fig. 2 with the rod abutting against the side wall 21 of the recess 20, and in this position the wire 3 is raised somewhat at the point of engagement with the rod so that the contact pressure and hence the wear on the bottom of the guide groove 5 is reduced.

Preferably the raising movement of the wire is not greater than that sound character is perceivable during the rewind operation.

What we claim is:

1. In a magnetic sound recording and reproducing apparatus, a supply reel and a take-up reel, a magnetic sound carrier movable between said reels, the sound carrier being wound onto the take-up reel during the recording and playback periods and onto the supply reel during the rewind periods and the rewind speed of the sound carrier being greater than the forward speed thereof, a magnetic head arranged between said two reels and provided with a guide groove through which the sound carrier is adapted to pass, an angularly bent rod carried by the magnetic head with its one leg rotatably mounted in the head and with its other leg extending under the sound carrier transversely to the same adjacent said guide groove, said rod serving as a sound carrier lifting member and being in frictional engagement with the sound carrier so as to be moved by the same on reversal of its direction of movement between a recording and playback position in which the sound carrier contacts the magnetic head with a pressure suitable for recording and playback purposes and a rewind position in which said member lifts the sound carrier and reduces the contact pressure in order to reduce the wear on the magnetic head during the rewind period.

2. In a magnetic sound recording and reproducing apparatus, a supply reel and a take-up reel, a magnetic sound carrier movable between said reels, the sound carrier being wound onto the take-up reel during the recording and playback periods and onto the supply reel during the rewind periods and the rewind speed of the sound carrier being greater than the forward speed thereof, a magnetic head arranged between said two reels and having a guide groove through which the sound carrier is adapted to pass, and a sound carrier lifting member provided on said magnetic head adjacent said guide groove, said member comprising an angularly bent rod, one leg of which forms a shaft which is rotatably mounted in the magnetic head in a plane substantially perpendicular to the plane through the shafts of the reels and forming an acute angle with the adjacent straight portion of the sound carrier, whereas the other leg extends under the sound carrier transversely to the same and frictionally engages said sound carrier so as to be moved by the same on reversal of its direction of movement between a recording and playback position in which the sound carrier contacts the magnetic head with a pressure suitable for recording and playback purposes and a rewind position in which said member lifts the sound carrier and reduces the contact pressure in order to reduce the wear on the magnetic head during the rewind period.

ROBERT ERIK OLOV OLSSON.
ALLAN BIRGER DAHL.

References Cited in the file of this patent

UNITED STATES PATENTS

| Number | Name | Date |
|---|---|---|
| 2,560,254 | Shickel | July 10, 1951 |